(12) United States Patent
Han et al.

(10) Patent No.: US 10,750,508 B2
(45) Date of Patent: Aug. 18, 2020

(54) CHANNEL STATE INFORMATION FEEDBACK METHOD, DEVICE, AND SYSTEM

(71) Applicant: Huawei Technologies Co., Ltd., Shenzhen, Guangdong (CN)

(72) Inventors: Wei Han, Shanghai (CN); Xiaoyan Bi, Shanghai (CN); Dageng Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

(21) Appl. No.: 16/186,282

(22) Filed: Nov. 9, 2018

(65) Prior Publication Data

US 2019/0082440 A1 Mar. 14, 2019

Related U.S. Application Data

(63) Continuation of application No. PCT/CN2017/077353, filed on Mar. 20, 2017.

(30) Foreign Application Priority Data

May 12, 2016 (CN) .......................... 2016 1 0316616

(51) Int. Cl.
*H04W 72/04* (2009.01)
*H04B 7/06* (2006.01)
(Continued)

(52) U.S. Cl.
CPC ...... *H04W 72/0466* (2013.01); *H04B 7/0413* (2013.01); *H04B 7/0465* (2013.01);
(Continued)

(58) Field of Classification Search
CPC .. H04B 7/0639; H04B 7/0634; H04B 7/0626; H04B 7/0482; H04B 7/0478;
(Continued)

(56) References Cited

U.S. PATENT DOCUMENTS

2009/0195455 A1* 8/2009 Kim ..................... H04B 7/0617
342/377
2009/0238303 A1* 9/2009 Mondal ................ H04B 7/0417
375/295
(Continued)

FOREIGN PATENT DOCUMENTS

CN 101123594 A 2/2008
CN 101383649 A 3/2009
(Continued)

OTHER PUBLICATIONS

International Search Report for PCTCN2017077353; dated May 31, 2017 (Year: 2017).*

*Primary Examiner* — Benjamin H Elliott, IV
(74) *Attorney, Agent, or Firm* — Conley Rose, P.C.

(57) ABSTRACT

Embodiments of the present application provide a channel state information feedback method, device, and system. The method includes: generating an uplink signal, where the uplink signal carries information for identifying multiple codewords and weights of the codewords; and transmitting the uplink signal to a base station (BS), so that the base station estimates a downlink channel based on the multiple codewords and weight information of the codewords in the uplink signal. In the embodiments of the present application, a user equipment UE side reports multiple codewords and weight information of the multiple codewords. This can resolve a problem in the prior art that precision of downlink channel estimation performed by a BS side is relatively low because only a single codeword is reported, and can effectively enhance precision indicated by channel information, without increasing complexity of a codebook design and implementation.

16 Claims, 5 Drawing Sheets

Generate an uplink signal, where the uplink signal carries information for identifying K codewords and weights of the K codewords, and K is an integer greater than or equal to 2 — S402

Transmit the uplink signal to a base station, so that the base station estimates a downlink channel — S404

(51) Int. Cl.
*H04L 1/02* (2006.01)
*H04B 7/0456* (2017.01)
*H04L 25/02* (2006.01)
*H04L 25/03* (2006.01)
*H04B 7/0413* (2017.01)
*H04L 5/00* (2006.01)
*H04W 88/08* (2009.01)

(52) U.S. Cl.
CPC ......... *H04B 7/0473* (2013.01); *H04B 7/0478* (2013.01); *H04B 7/0482* (2013.01); *H04B 7/0626* (2013.01); *H04B 7/0634* (2013.01); *H04B 7/0639* (2013.01); *H04L 1/02* (2013.01); *H04L 5/0048* (2013.01); *H04L 25/0208* (2013.01); *H04L 25/0226* (2013.01); *H04L 25/03898* (2013.01); *H04W 88/08* (2013.01)

(58) Field of Classification Search
CPC .. H04B 7/0473; H04B 7/0465; H04B 7/0413; H04L 25/03898; H04L 25/0226; H04L 25/0208; H04L 5/0048; H04L 1/02; H04W 72/0466; H04W 88/08
See application file for complete search history.

(56) References Cited

U.S. PATENT DOCUMENTS

| | | | |
|---|---|---|---|
| 2010/0150266 A1* | 6/2010 | Mondal | H04B 7/0417 375/296 |
| 2011/0080972 A1* | 4/2011 | Xi | H04B 7/0617 375/267 |
| 2011/0090976 A1* | 4/2011 | Kim | H04B 7/0617 375/260 |
| 2012/0113851 A1* | 5/2012 | Schober | H04B 7/0626 370/252 |
| 2013/0294279 A1* | 11/2013 | Nagata | H04B 7/024 370/252 |
| 2014/0198870 A1* | 7/2014 | Kotecha | H04B 7/0417 375/267 |
| 2014/0254508 A1* | 9/2014 | Krishnamurthy | H04B 7/0417 370/329 |
| 2015/0180557 A1* | 6/2015 | Kim | H04B 7/0456 375/267 |
| 2015/0200719 A1* | 7/2015 | Cui | H04B 7/0639 375/267 |
| 2016/0308624 A1* | 10/2016 | Rong | H04B 7/024 |
| 2019/0082440 A1* | 3/2019 | Han | H04B 7/0413 |

FOREIGN PATENT DOCUMENTS

| | | |
|---|---|---|
| CN | 101777968 A | 7/2010 |
| CN | 101826941 A | 9/2010 |
| CN | 101924612 A | 12/2010 |
| CN | 102710308 A | 10/2012 |

* cited by examiner

CHANNEL STATE INFORMATION FEEDBACK METHOD, DEVICE, AND SYSTEM

CROSS-REFERENCE TO RELATED APPLICATIONS

This application is a continuation of International Application No. PCT/CN2017/077353 filed on Mar. 20, 2017, which claims priority to Chinese Application No. 201610316616.9 filed on May 12, 2016, the disclosures of the aforementioned applications are hereby incorporated by reference in their entireties.

TECHNICAL FIELD

The present application relates to the mobile communications network field, and in particular, to a channel information feedback method, device, and system.

BACKGROUND

A multiple-input multiple-output (MIMO) technology based on a multiple-antenna system is one of key technologies for 3G and 4G wireless air interfaces. Without increasing usage of time-frequency resources, the MIMO technology can double spectrum efficiency by effectively using degrees of freedom in space domain. To effectively use the degrees of freedom in space domain, both a signal transmit end and a signal receive end need to obtain channel information.

Generally, the receive end may calculate channel information by receiving and demodulating a known training sequence symbol, but the transmit end can obtain channel information only by using a channel information feedback mechanism. As wireless broadband applications such as mobile multimedia continuously pose new challenges on bandwidth of a communications system, using a massive MIMO technology based on a massive antenna system as one of key technologies for a future 5G wireless air interface has become a consensus in the industry. As in the foregoing MIMO technology, to effectively use massive degrees of freedom in space domain and significantly enhance spectrum efficiency, both the receive end and the transmit end are required to know channel information. Channel information dimensions corresponding to the massive antenna increase significantly. Therefore, design of a channel information feedback method and mechanism is especially important.

The prior art provides a channel information feedback method. A base station (BS) side obtains downlink channel state information, and uses a channel state information feedback solution based on a codebook. The codebook is a predetermined M×N matrix C, where each column vector is referred to as a codeword, indicated by $C=[C_1, C_2, \ldots, C_i, \ldots, C_N]$. A quantity of elements included in each codeword is referred to as a dimension of the codeword, and corresponds to a dimension of measured channel information. The channel state information feedback solution based on the codebook is as follows: User equipment (UE) selects, according to a predefined rule, a specific codeword $C_i$ for channel state information (M×1 vector) to be fed back, and then transmits a sequence number i of the codeword in the codebook to the BS side by using an uplink channel. The BS selects, from the codeword book C according to the sequence number i, the codeword $C_i$ as an estimated input value of downlink channel information.

A disadvantage of the prior art is that downlink channel estimation uniquely corresponds to a single codeword in the codebook in the prior art. A single codeword is used to represent channel estimation. Therefore, precision of channel estimation severely depends on a spatial resolution of a specific codebook. For the conventional MIMO system, because there are few BS antenna array elements, and a dimension of a codeword in a codebook in the system is relatively low, a spatial resolution of a codeword can be enhanced easily by increasing a quantity of codewords. However, with significant increase of antenna array elements configured for a massive MIMO BS, enhancing a spatial resolution by increasing a quantity of high-dimensional codewords becomes extremely difficult, both in a theoretical method and an engineering implementation.

SUMMARY

To resolve the foregoing technical problem that precision of channel information feedback is reduced due to a low spatial resolution of a codebook, embodiments of the present application provide a data processing method, system, and device. The technical solutions are as follows:

According to a first aspect, an embodiment of the present application provides a channel state feedback method, including: generating an uplink signal, where the uplink signal carries information for identifying K codewords and information for identifying weights of the K codewords, and K is an integer greater than or equal to 2; and transmitting the uplink signal to a base station, so that the base station estimates a downlink channel.

According to another aspect, an embodiment of the present application further provides a channel state obtaining method, including: receiving an uplink signal, where the uplink signal carries information for identifying K codewords and weights of the K codewords, and K is an integer greater than or equal to 2; and estimating a downlink channel based on the information for identifying the K codewords and the weights of the K codewords.

According to another aspect, an embodiment of the present application further provides a channel information feedback apparatus, including: a processing unit, configured to generate an uplink signal, where the uplink signal carries information for identifying K codewords and information for identifying weights of the K codewords, and K is an integer greater than or equal to 2; and a transmission unit, configured to transmit the uplink signal to a base station, so that the base station estimates a downlink channel.

According to another aspect, an embodiment of the present application further provides a channel state obtaining apparatus, including: a receiving unit, configured to receive an uplink signal, where the uplink signal carries information for identifying K codewords and weights of the K codewords, and K is an integer greater than or equal to 2; and a processing unit, configured to estimate a downlink channel based on the information for identifying the K codewords and the weights of the K codewords.

According to another aspect, an embodiment of the present application further provides a network system, including a base station and one or more user equipment, where the base station is connected to the one or more user equipments in wireless mode, where the user equipment is configured to: generate an uplink signal, where the uplink signal carries information for identifying K codewords and information for identifying weights of the K codewords, and K is an integer greater than or equal to 2; and transmit the uplink signal to the base station, so that the base station estimates a downlink channel; and the base station is configured to receive the uplink signal, and estimate the downlink channel based on the information for identifying the K codewords and the weights of the K codewords.

According to another aspect, an embodiment of the present application further provides user equipment, including: a memory, configured to store computer-executable program code; a transceiver; and a processor coupled with the memory and the transceiver; where the program code includes an instruction; and when the processor executes the instruction, the instruction enables the user equipment to perform the following operations: generating an uplink signal, where the uplink signal carries information for identifying K codewords and information for identifying weights of the K codewords, and K is an integer greater than or equal to 2; and transmitting the uplink signal to a base station, so that the base station estimates a downlink channel.

According to another aspect, an embodiment of the present application further provides a base station, including: a memory, configured to store computer-executable program code; a transceiver; and a processor coupled with the memory and the transceiver; where the program code includes an instruction; and when the processor executes the instruction, the instruction enables the base station to perform the following operations: receiving an uplink signal, where the uplink signal carries information for identifying K codewords and weights of the K codewords, and K is an integer greater than or equal to 2; and estimating a downlink channel based on the information for identifying the K codewords and the weights of the K codewords.

In the embodiments of the present application, a UE side reports multiple codewords and weight information of the multiple codewords. This can resolve a problem in the prior art that precision of downlink channel estimation performed by a BS side is relatively low because only a single codeword is reported, and can effectively enhance precision indicated by channel information, without increasing complexity of a codebook design and implementation.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may derive other drawings from these accompanying drawings without creative efforts.

DETAILED DESCRIPTION

To make the application objectives, features, and advantages of the present application clearer and more comprehensible, the following clearly describes the technical solutions in the embodiments of the present application with reference to the accompanying drawings in the embodiments of the present application. Apparently, the embodiments described in the following are merely a part rather than all of the embodiments of the present application. All other embodiments obtained by a person skilled in the art based on the embodiments of the present application shall fall within the protection scope of the present application.

In the specification, claims, and accompanying drawings of the present application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
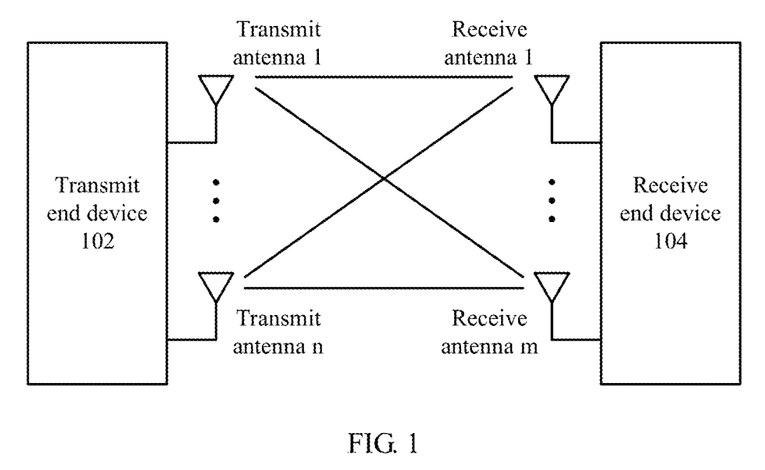
FIG. 1 is a schematic diagram of an application scenario of MIMO according to an embodiment of the present application.

FIG. 1 is a schematic diagram of an application scenario of MIMO. The application scenario shown in FIG. 1 includes a transmit end device 102 and a receive end device 104. The transmit end device 102 may be, for example, a base station, but is not limited thereto. The receive end device 104 may be, for example, a terminal device, but is not limited thereto. n(n>1) transmit antennas are configured for the transmit end device 102, and are specifically denoted as transmit antennas 1 to n. m(m>1) receive antennas are configured for the receive end device 104, and are specifically denoted as receive antennas 1 to m. In this way, a total of m×n channels exist between the n transmit antennas and the m receive antennas, as shown by solid lines between the transmit antennas 1 to n and the receive antennas 1 to m (some channels are not shown).

In an ideal situation (for example, without considering noise), the m×n channels may be indicated by using the following channel matrix:

$$H = \begin{bmatrix} h_{11} & \cdots & h_{1n} \\ \vdots & \ddots & \vdots \\ h_{m1} & \cdots & h_{mn} \end{bmatrix} \quad (1)$$

where $h_{ij}(1 \leq i \leq m, 1 \leq j \leq n)$ indicates a channel impulse response (Channel Impulse Response, CIR) of a channel between a transmit antenna j and a receive antenna i. The receive end device 104 may determine the channel matrix by using a pilot (Pilot) transmitted by the transmit end device 102.

Figure 2:
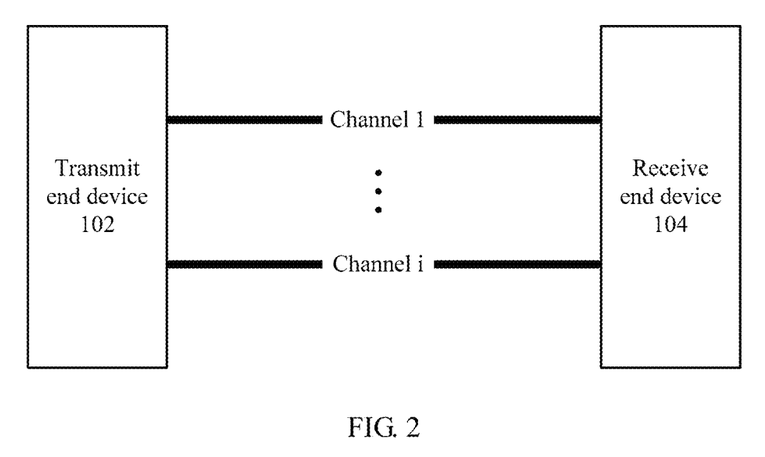
FIG. 2 is a schematic diagram of m×n channels according to an embodiment of the present application.

As shown in FIG. 2, the m×n channels may be equivalent to i channels that are mutually independent. The channels are also referred to as beams (beam), and may be obtained by using multiple technologies, for example, a precoding technology. The precoding technology defines a beam by using a precoding matrix. Specifically, column vectors (also referred to as precoding vectors) of the precoding matrix are mutually orthogonal, and each column vector corresponds to one beam. An element of the column vector corresponds an antenna (or antenna port) on a one-to-one basis, and is used for weighting an antenna, so that signals transmitted by the antenna overlap each other to form a beam. A quantity of beams of the terminal device is equal to a quantity of singular values of the channel matrix, that is, a rank of the channel matrix. When some singular values are excessively small (lower than a preset threshold), a quantity of the singular values that are excessively small is subtracted from the foregoing quantity. For ease of description in the specification, the rank of the channel matrix is uniformly used to indicate the quantity of the channels that are mutually independent.

With continuous development of communications theory and practice, more wireless communications technologies emerge and gradually become mature. The wireless communications technologies include but are not limited to a Time Division Multiple Access (TDMA) technology, a Frequency Division Multiple Access (FDMA) technology, a Code Division Multiple Access (CDMA) technology, a Time Division-Synchronous Code Division Multiple Access (TD-SCDMA) technology, an Orthogonal Frequency Division Multiple Access (OFDMA) technology, a Single Carrier Frequency Division Multiple Access (SC-FDMA) technology, a Space Division Multiple Access (SDMA) technology, technologies evolved and derived from the technologies, and the like. As radio access technologies (RAT), the wireless communications technologies are used in many wireless communications standards to construct various wireless communications systems (or networks) well known by people today, including but not limited to a Global System for Mobile Communications (GSM), CDMA2000, Wideband CDMA (WCDMA), Wi-Fi defined in the 802.11 series standards, Worldwide Interoperability for Microwave Access (WiMAX), Long Term Evolution (LTE), LTE-Advanced (LTE-A), systems evolved from the wireless communications systems, and the like. Unless otherwise specified, the technical solutions provided by the embodiments of the present application may be applied to the foregoing wireless communications technologies and wireless communications systems. In addition, terms "system" and "network" are interchangeable.

Figure 3:
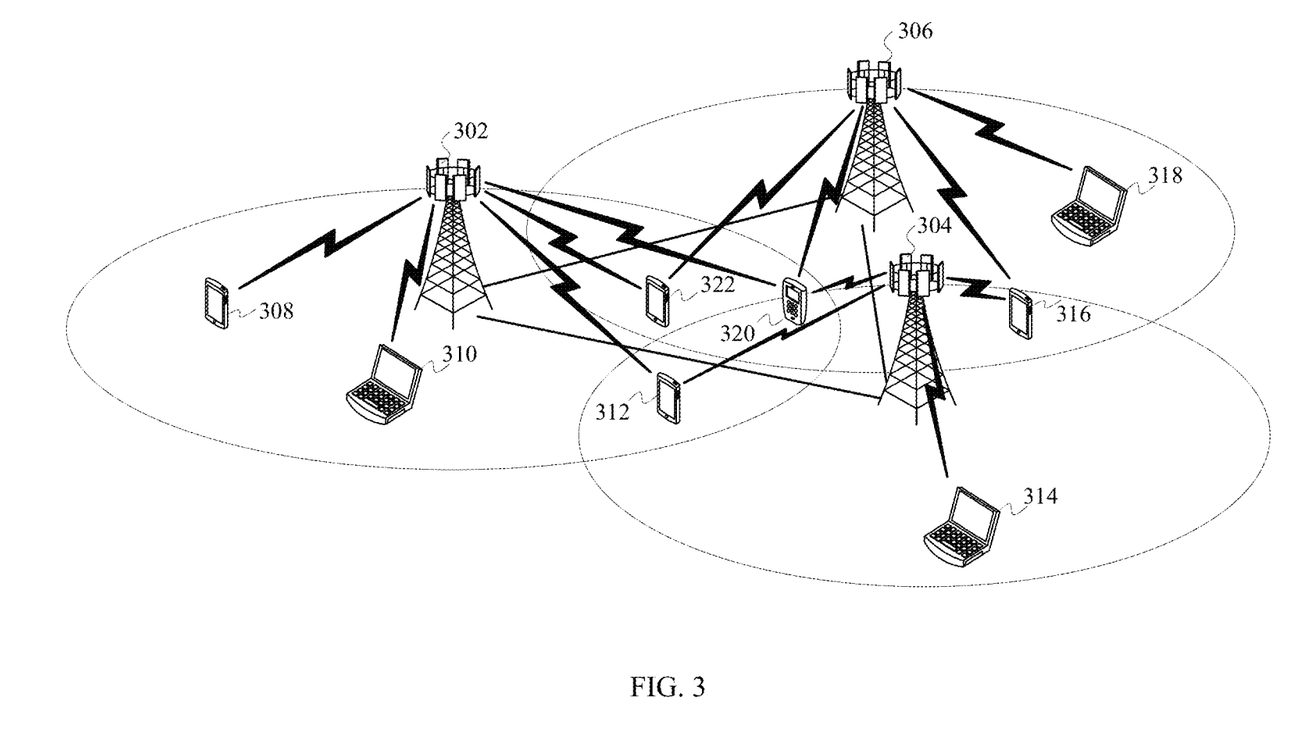
FIG. 3 is an illustrative schematic diagram of a wireless communications network 300 according to an embodiment of the present application.

FIG. 3 is an illustrative schematic diagram of a wireless communications network 300 according to an embodiment of the present application. As shown in FIG. 3, the wireless communications network 300 includes base stations 302 to 306 and terminal devices 308 to 322, where the base stations 302 to 306 may communicate with each other by using backhaul links (as shown by direct lines between the base stations 302 to 306), and the backhaul links may be wired backhaul links (for example, optical fibers or copper cables), or may be wireless backhaul links (for example, microwave). The terminal devices 308 to 322 may communicate with the base stations 302 to 306 by using radio links (as shown by fold lines between the base stations 302 to 306 and the terminal devices 308 to 322).

The base stations 302 to 306 are configured to provide wireless access services for the terminal devices 308 to 318. Specifically, each base station provides a service coverage area (also referred to as a cell, as shown by each elliptical area in FIG. 3), and a terminal device entering the area may communicate with a base station by using a radio signal, to accept a wireless access service provided by the base station. Service coverage areas of the base stations may overlap each other, and a terminal device in an overlapping area may receive radio signals from multiple base stations. For example, as shown in FIG. 3, a service coverage area of the base station 302 overlaps that of the base station 304, and the terminal device 312 is located in the overlapping area. For another example, as shown in FIG. 3, a common overlapping area exists between service coverage areas of the base stations 302 to 306, and the terminal device 320 is located in the overlapping area.

Depending on a used wireless communications technology, the base station may also be referred to as a NodeB, an evolved NodeB (eNodeB), an access point (AP), or the like. In addition, based on sizes of provided service coverage areas, base stations may be classified into a macro base station providing a macro cell, a micro base station providing a pico cell, and a femto base station providing a femto cell. With continuous evolution of the wireless communications technology, a future base station may also use another name.

The terminal devices 308 to 318 may be various wireless communications devices having wireless communication functions, for example, including but not limited to a mobile cellular phone, a cordless telephone set, a personal digital assistant (PDA), a smartphone, a notebook computer, a tablet computer, a wireless data card, a wireless modulator demodulator (modem), or a wearable device such as a smart watch. With emergence of an Internet of Things (IOT) technology, more devices that previously have no communication function, for example, including but not limited to a household appliance, a vehicle, a tool device, a service device, and a service facility, begin to obtain wireless communication functions by configuring wireless communications units, and therefore can access a wireless communications network and implement remote control. Because the wireless communications units are configured for the devices, the devices have the wireless communication functions, and also fall within the scope of wireless communications devices. In addition, the terminal devices 308 to 318 may also be referred to as mobile stations, mobile devices, mobile terminals, wireless terminals, handheld devices, clients, or the like.

Multiple antennas may be configured for each of the base stations 302 to 306 and the terminal devices 308 to 322 to support a MIMO technology. In addition, the base station 302 and the terminal devices 308 to 322 may perform communication by using various wireless communications technologies, for example, including but not limited to the wireless communications technologies mentioned above.

It should be noted that the wireless communications network 300 shown in FIG. 3 is used merely as an example but not intended to limit the technical solution of the present application. A person skilled in the art should understand that, in a specific implementation process, the wireless communications network 300 further includes other devices, for example, including but not limited to a base station controller (BSC). In addition, the base stations and the terminal devices may be configured according to specific requirements.

According to the technical solution provided by this embodiment of the present application, a terminal device uses multiple codewords to jointly identify a downlink channel CSI value, and then transmits information about the multiple codewords to a base station by using an uplink channel; and the base station reconstructs a downlink channel estimation value according to the received information about the multiple codewords and weight information thereof. A CSI feedback process provided by this embodiment of the present application is hereinafter described in detail.

It should be understood that, in the following embodiments, a process of generating an uplink signal or a downlink signal may be understood as follows: A transmit side device generates a frame in a specific format (a data frame or a management frame), where information or data (generally in a binary form) to be transmitted to a peer is encapsulated in a field of the frame in the specific format, and then transmits the frame to a receive side device by mapping the frame in the specific format to a resource block (for example, an OFDM symbol) representing a frequency domain and a time domain. The frame in the specific format may be a MAC entity frame specified in the existing 3GPP standard, or may be a frame in another format specified by the 3GPP in the future, or a customized frame. A structure of the frame is not limited in this embodiment of the present application.

Embodiment 1

Figure 4:
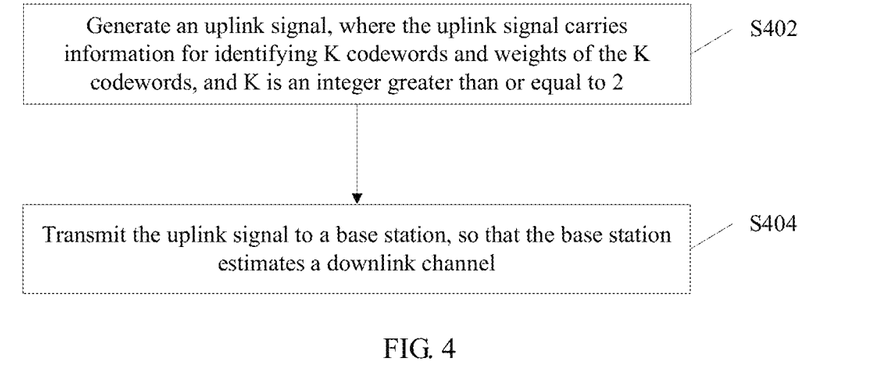
FIG. 4 is a schematic flowchart of a channel state feedback method according to an embodiment of the present application.

As shown in FIG. 4, a channel state feedback method 400 provided by this embodiment of the present application includes the following steps.

Step 402: Generate an uplink signal, where the uplink signal carries information for identifying K codewords and information for identifying weights of the K codewords, and K is an integer greater than or equal to 2.

Step 404: Transmit the uplink signal to a base station, so that the base station estimates a downlink channel based on the information for identifying multiple codewords and information for identifying weights of the multiple codewords.

A weight is used to represent a correspondence between a codeword and a downlink channel matrix.

K is a quantity of codewords. In a specific implementation solution, K may be directly defined in the standard as a constant, or may be preconfigured by the BS side, or a value of K may be determined through signaling interaction. This is not limited in the present application. It should be understood that, the value of K may affect precision of downlink channel estimation performed by the BS. Generally, if the value of K is greater, precision is higher.

Optionally, before the uplink signal is generated, the method 400 further includes the following steps.

Step A: Receive a downlink signal, where the downlink signal carries a pilot.

Step B: Obtain a downlink channel matrix according to the pilot.

It should be understood that, the downlink signal or uplink signal provided by this embodiment of the present application indicates a frequency domain resource or a time domain resource, and may be applicable to a signal defined in the existing 3GPP standard, and a signal of a 5G related standard, defined in a future 3GPP standard, including but not limited to an orthogonal frequency-division multiplexing (OFDM) symbol. The OFDM symbol is generally obtained by performing weighted summation on a group of subcarriers, where weights of the subcarriers are to-be-transmitted modulation symbols, including a pilot and data, and the pilot is used for channel estimation.

It should be understood that, how to obtain the downlink channel matrix according to the pilot falls within the prior art, and is not further described herein. Each UE works on a channel. For the UE, a downlink channel matrix corresponding to the UE may be indicated by a column vector $h_{DL}$, for example:

$$h_{DL} = \begin{bmatrix} h_{11} \\ h_{21} \\ h_{31} \\ \ldots \\ h_{n1} \end{bmatrix},$$

where n indicates a quantity of transmit antennas at a transmit end, and $h_{11}$ to $h_n1$ may be referred to as elements in the column vector.

Optionally, before the uplink signal is generated, the method 400 further includes:

Step A: Obtain the weights of the K codewords.

Optionally, before the uplink signal is generated, the method 400 further includes:

Step B: Obtain the K codewords.

Optionally, the K codewords and the weights of the K codewords are obtained based on the downlink channel matrix and a prestored codebook.

It should be understood that, the prestored codebook may refer to a codebook in the existing 3GPP standard, or may be a codebook that is specially designed.

For example, an existing codebook may be denoted as a matrix C, and each column vector is a codeword; a total quantity of codewords in the matrix is n, a $K^{th}$ codeword is denoted as $c_k$, a weight of the $K^{th}$ codeword is denoted as $\alpha_k$, and the $K^{th}$ codeword and the weight thereof are denoted as $(\alpha_k, c_k)$.

$$C = \begin{bmatrix} c_{11} & \cdots & c_{1n} \\ \vdots & \ddots & \vdots \\ c_{m1} & \cdots & c_{mn} \end{bmatrix}.$$

For example, a codebook that is specially designed is as follows: When a massive antenna array of the BS is of a two-dimensional planar array structure ($M_{hor}$ array element in a horizontal direction and $M_{ver}$ array element in a vertical direction, where $M=M_{hor} \times M_{ver}$), the codebook may use a Kronecker product structure:

$$C = C_{hor} \otimes C_{ver},$$

where C indicates the codebook that is specially designed, and is an M×N matrix;

$C_{hor}$ indicates a sub codebook in the horizontal direction, and is an $M_{hor} \times N_{hor}$ matrix;

$C_{ver}$ indicates a sub codebook in the vertical direction, and is an $M_{ver} \times N_{ver}$ matrix.

A sub codebook design may use a discrete Fourier transform DFT matrix codebook structure.

Specifically, there are multiple implementation methods for obtaining the multiple codewords and the weights of the multiple codewords based on the downlink channel matrix and the codebook. A first implementation method is as follows:

For example, an existing codebook may be denoted as a matrix C, and each column vector is a codeword; a total quantity of codewords in the matrix is n, a $K^{th}$ codeword is denoted as $c_k$, a weight of the $K^{th}$ codeword is denoted as $\alpha_k$, and the $K^{th}$ codeword and the weight thereof are denoted as $(\alpha_k, c_k)$.

$$C = \begin{bmatrix} c_{11} & \cdots & c_{1n} \\ \vdots & \ddots & \vdots \\ c_{m1} & \cdots & c_{mn} \end{bmatrix}.$$

When the codebook is an orthogonal codebook (that is, when the matrix C is an orthogonal matrix), $K(\alpha_k, c_k)$ combinations are determined according to the following steps.

Step A: Map the downlink channel matrix h to each orthogonal base of the codebook C, which is denoted as $\alpha = C^H * h$, or may be denoted as:

$$\alpha = \begin{bmatrix} c_{11}^* & \cdots & c_{m1}^* \\ \vdots & \ddots & \vdots \\ c_{1n}^* & \cdots & c_{mn}^* \end{bmatrix} \times \begin{bmatrix} h_{11} \\ h_{21} \\ h_{31} \\ \cdots \\ h_{m1} \end{bmatrix} = \begin{bmatrix} a_{11} \\ a_{21} \\ a_{31} \\ \cdots \\ a_{n1} \end{bmatrix},$$

where CH indicates conjugate transpose processing on the codebook C, a superscript * indicates a conjugate algorithm, and h is the downlink channel matrix of the UE;

$\alpha_{11} = c_{11}^* \times h_{11} + c_{21}^* \times h_{21} \ldots c_{m1}^* \times h_{m1}$ $\alpha_{21} = c_{12}^* \times h_{11} + c_{22}^* \times h_{21} \ldots c_{m2}^* \times h_{m1}$ By analogy, the column vector $\alpha$ may be obtained.

Step B: Obtain codewords corresponding to first K largest components in the column vector $\alpha$ to form $K(\alpha_k, c_k)$ combinations.

Specifically, a modulo operation is performed on elements in the column vector $\alpha$, and the codewords corresponding to the first K largest components are $\{c_k\}$. For example, assuming that $\alpha_{11}$ and $\alpha_{21}$ after the modulo operation are first two largest components, codewords respectively corresponding to $\alpha_{11}$ and $\alpha_{21}$ are:

$$\begin{bmatrix} c_{11} \\ c_{21} \\ c_{31} \\ \cdots \\ c_{m1} \end{bmatrix} \text{ and } \begin{bmatrix} c_{12} \\ c_{22} \\ c_{32} \\ \cdots \\ c_{m2} \end{bmatrix},$$

where K is a quantity of codewords. In a specific implementation solution, K may be directly defined in the standard as a constant, or may be preconfigured by the BS side, or the value of K may be determined through signaling interaction. This is not limited in the present application. It should be understood that, the value of K may affect precision of downlink channel estimation performed by the BS. Generally, if the value of K is greater, precision is higher.

According to the first implementation solution, the K codewords and the weights $\{\alpha_k\}$ of the K codewords can be obtained.

Optionally, the multiple codewords and the weights of the multiple codewords are obtained based on the downlink channel matrix and a predefined codebook. A second implementation method includes the following steps.

Step A: Map the downlink channel matrix h to each base of the codebook C, which is denoted as $\alpha = C^H * h$, or may be denoted as:

$$\alpha = \begin{bmatrix} c_{11}^* & \cdots & c_{m1}^* \\ \vdots & \ddots & \vdots \\ c_{1n}^* & \cdots & c_{mn}^* \end{bmatrix} \times \begin{bmatrix} h_{11} \\ h_{21} \\ h_{31} \\ \cdots \\ h_{n1} \end{bmatrix} = \begin{bmatrix} a_1 \\ a_2 \\ a_3 \\ \cdots \\ a_n \end{bmatrix},$$

where CH indicates conjugate transpose processing on the codebook C, a superscript * indicates a conjugate algorithm, and h is the downlink channel matrix of the UE;

$\alpha_1 = c_{11}^* \times h_{11} + c_{21}^* \times h_{21} \ldots c_{m1}^* \times h_{m1}$ $\alpha_2 = c_{12}^* \times h_{11} + c_{22}^* \times h_{21} \ldots c_{m2}^* \times h_{m1}$ By analogy, the column vector $\alpha$ may be obtained.

It should be understood that, a weight of a first codeword is $\alpha_1$, and a weight of a second codeword is $\alpha_2$, and so on.

Step B: Obtain a codeword corresponding to a largest component in the column vector $\alpha$ to form a first $(\alpha_k, c_k)$ combination.

Specifically, a modulo operation is performed on elements in the column vector $\alpha$, and a codeword corresponding to a largest component is one of the K codewords. For example, after the modulo operation, $\alpha_{11}$ is a largest component, and a codeword corresponding to $\alpha_{11}$ is:

$$\begin{bmatrix} c_{11} \\ c_{21} \\ c_{31} \\ \cdots \\ c_{m1} \end{bmatrix}.$$

Step C: Delete, from the downlink channel matrix h, the component of the first $(\alpha_k, c_k)$ combination obtained in step B, to form a new downlink channel matrix.

$\Delta h = h - \alpha_k c_k$ $h \leftarrow \Delta h$

Specifically, $$\Delta h = \begin{bmatrix} h_{11} \\ h_{21} \\ h_{31} \\ \cdots \\ h_{n1} \end{bmatrix} - \alpha_{11} * \begin{bmatrix} c_{11} \\ c_{21} \\ c_{31} \\ \cdots \\ c_{m1} \end{bmatrix} = \begin{bmatrix} h_{11} - \alpha_{11} c_{11} \\ h_{21} - \alpha_{11} c_{21} \\ h_{31} - 11 c_{31} \\ \cdots \\ h_{n1} - \alpha_{11} c_{m1} \end{bmatrix}.$$

Step D: Use $\Delta h$ as a new downlink channel matrix, and repeat steps A to C until $K(\alpha_k, c_k)$ combinations are obtained.

According to the second implementation solution, the K codewords and the weights $\{\alpha_k\}$ of the K codewords can be obtained.

Optionally, the multiple codewords and the weights of the multiple codewords are obtained based on the downlink channel matrix and a predefined codebook. A third implementation method includes the following steps.

Step 1: Design a codebook CB for several $(\alpha_k, c_k)$ combinations, where each codeword in the codebook CB corresponds to one of $K(\alpha_k, c_k)$ combinations.

Step 2: Obtain sequence numbers of the $K(\alpha_k, c_k)$ combinations in the codebook CB.

Step 3: Use the sequence numbers as identity information for indicating the K codewords and the weights of the K codewords, and feed back the identity information to the base station.

Specifically, for example, a basic codebook C is denoted as:

$$c = \begin{bmatrix} c_{11} & \cdots & c_{1n} \\ \vdots & \ddots & \vdots \\ c_{m1} & \cdots & c_{mn} \end{bmatrix}.$$

When the value of K is 2, the codebook CB may be denoted as:

$$CB = \begin{bmatrix} PMI_1 & PMI_1 & PMI_1 & PMI_2 & PMI_2 & PMI_2 \\ PMI_2 & PMI_3 & PMI_N & PMI_1 & PMI_3 & PMI_N \\ & & \cdots & & \cdots & \\ \alpha_1 & \alpha_1 & \alpha_1 & \alpha_2 & \alpha_2 & \alpha_2 \\ \alpha_2 & \alpha_3 & \alpha_N & \alpha_1 & \alpha_3 & \alpha_N \end{bmatrix},$$

where the PMI indicates a column vector in the basic codebook C; the PMI1 indicates a column vector $$\begin{bmatrix} c_{11} \\ c_{21} \\ c_{31} \\ \cdots \\ c_{m1} \end{bmatrix}$$

whose sequence number is 1, the PMI2 indicates a column vector $$\begin{bmatrix} c_{12} \\ c_{22} \\ c_{32} \\ \cdots \\ c_{m2} \end{bmatrix}$$

whose sequence number is 2, and so on; and $\alpha_1$ and $\alpha_2$ respectively indicate weights of codewords. For the method for obtaining $\alpha_1$ and $\alpha_2$, refer to the method for calculating values of $\alpha_1$ and $\alpha_2$ that is mentioned in the foregoing two implementations. Details are not further described herein.

Likewise, when the value of K is 3, the codebook CB may be denoted as:

$$CB = \begin{bmatrix} PMI_1 & PMI_1 & PMI_1 & PMI_1 & PMI_1 & PMI_1 \\ PMI_2 & PMI_2 & PMI_2 & PMI_3 & PMI_3 & PMI_3 \\ PMI_3 & PMI_4 & PMI_N & PMI_2 & PMI_4 & PMI_N \\ & \cdots & & \cdots & & \cdots \\ \alpha_1 & \alpha_1 & \alpha_1 & \alpha_1 & \alpha_1 & \alpha_1 \\ \alpha_2 & \alpha_2 & \alpha_2 & \alpha_3 & \alpha_3 & \alpha_3 \\ \alpha_3 & \alpha_4 & \alpha_N & \alpha_2 & \alpha_4 & \alpha_N \end{bmatrix},$$

where the PMI indicates a column vector in the basic codebook C; the PMI1 indicates a column vector $$\begin{bmatrix} c_{11} \\ c_{21} \\ c_{31} \\ \cdots \\ c_{m1} \end{bmatrix}$$

whose sequence number is 1, the PMI2 indicates a column vector $$\begin{bmatrix} c_{12} \\ c_{22} \\ c_{32} \\ \cdots \\ c_{m2} \end{bmatrix}$$

whose sequence number is 2, and so on. For the method for obtaining $\alpha_1$, $\alpha_2$, and $\alpha_3$, refer to the method for obtaining values of $\alpha_1$ and $\alpha_2$ that is mentioned in the foregoing two implementations. Details are not further described herein.

In essence, the third implementation is to combine the K codewords and the weight of the K codewords into a column vector to form a new codebook. When the UE needs to report the information for identifying the K codewords and the weights of the K codewords, the UE needs to report only sequence numbers of codewords of the new codebook. An advantage of this implementation solution is that overheads of uplink signaling are reduced, and that only a few bits may be used.

For example, when the value of K is 2, assuming that two selected codewords are respectively a first column vector $$\begin{bmatrix} c_{11} \\ c_{21} \\ c_{31} \\ \cdots \\ c_{m1} \end{bmatrix}$$

and a second column vector $$\begin{bmatrix} c_{12} \\ c_{22} \\ c_{32} \\ \cdots \\ c_{m2} \end{bmatrix}$$

in the codebook $$C \begin{bmatrix} c_{11} & \cdots & c_{1n} \\ \vdots & \ddots & \vdots \\ c_{m1} & \cdots & c_{mn} \end{bmatrix},$$

when the third implementation is used, only a sequence number 1 in the new codebook CB needs to be reported, because in the new codebook CB, codewords corresponding to the first column vector and the second column vector in the original codebook C are:

$$\begin{bmatrix} PMI_1 \\ PMI_2 \\ \alpha_1 \\ \alpha_2 \end{bmatrix}.$$

It should be understood that, in the third implementation solution, the UE needs to store the codebook C and the new codebook CB (which may also be referred to as a second codebook).

It should be further understood that, in the third implementation solution, the BS device also needs to store the codebook C and the new codebook CB.

There are also multiple implementation methods for the UE to feed back the information for indicating the K codewords and the information for indicating the weights of the K codewords to the BS. For example, a first implementation method is: encoding and modulating the sequence numbers of the K codewords in digital mode for transmission to the BS, and modulating the information for indicating the weights of the K codewords in analog mode for transmission to the BS.

Specifically, identities or numbers [i, j, . . . , k] of the K codewords in the codebook C are converted into binary bit information respectively, and then are combined into a codeword bitstream; encoding and modulation are performed on the codeword bitstream to obtain a codeword signal stream; the weights $[\alpha_1 \alpha_2 \ldots \alpha_K]$ of the K codewords are respectively used as to-be-transmitted signals that are not quantized or encoded, and amplitude calibration information of the signals is calculated and combined with the signals into a weight information signal stream; and the codeword signal stream and the weight information signal stream are transmitted separately by using an uplink channel.

For example, three codewords are selected, and numbers of the codewords are 3, 5, and 6 respectively. Only 3, 5, and 6 need to be converted into binary bits (for example, the codebook C includes six codebooks in total, and in this case, three bits need to be used for identification). In this case, 3 is indicated by 011, 5 is indicated by 101, 6 is indicated by 110, and a formed bitstream is 011101110. The bitstream information is carried in a message, mapped to a radio transmission resource block (for example, an OFDM symbol, or a signal indicating a time domain resource or a frequency domain resource, defined in a future 5G standard), and then transmitted to the BS side.

A method for calculating the amplitude calibration information may be: selecting an element $\alpha_k$ whose modulus value is largest from $[\alpha_1 \alpha_2 \ldots \alpha_K]$, and quantizing the modulus value $|\alpha_k|$ of the element. For example, if quantized into B bits, amplitude calibration is AMP=floor($|\alpha_k| \times 2^B$), where floor($\square$) is a rounding operation. The AMP is used as the amplitude calibration information and transmitted to the BS side.

A second implementation method is: encoding and modulating the sequence numbers of the K codewords in digital mode for transmission, quantizing the information $\alpha_k$ for indicating the weights of the K codewords, and performing encoding and modulation in digital mode for transmission to the BS.

Specifically, identities or numbers [i, j, . . . , k] of the K codewords in the codebook C are respectively converted into binary bit information, and then combined into a codeword bitstream; encoding and modulation are performed on the codeword bitstream to obtain a codeword signal stream; and K pieces of weight information $[\alpha_1 \alpha_2 \ldots \alpha_K]$ are respectively quantized into binary bit information and combined into a second information bitstream. Encoding and modulation are performed on the second information bitstream to obtain a second information signal stream.

The codeword signal stream and the second information signal stream are transmitted separately by using an uplink channel.

For example, a value of $$\alpha = \begin{bmatrix} \alpha_{11} \\ \alpha_{21} \\ \alpha_{31} \\ \cdots \\ \alpha_{n1} \end{bmatrix} \text{ is } \begin{bmatrix} 3+5i \\ 4+2i \\ 2+3i \\ 6+4i \end{bmatrix},$$

and the quantizing $\alpha_K$ into binary bit information may be considered as performing binary conversion on a real part and an imaginary part of a complex number in the column vector. For example, 3+5i is converted into a binary stream 011101.

4+2i is converted into a binary stream 100011. The bitstream information is carried in a message, mapped to a radio transmission resource block (for example, an OFDM symbol, or a signal indicating a time domain resource or a frequency domain resource, defined in a future 5G standard), and then transmitted to the BS side.

A third implementation method is merely intended for the foregoing implementation solution to the new codebook CB. When the UE and the BS side store the new codebook CB, the UE needs to report a sequence number of a codeword only.

In this embodiment of the present application, optionally, the uplink signal may further carry codeword quantity information.

In this embodiment of the present application, optionally, the uplink signal may further carry information about a feedback mode of the weights of the K codewords.

Optionally, the feedback mode is aforementioned feedback in digital mode or feedback in analog mode.

Optionally, the uplink signal may further carry the amplitude calibration information of the weights of the K codewords.

Optionally, the method further includes: prestoring a second codebook, where the second codebook is the new codebook CB mentioned in the foregoing solution.

In this embodiment of the present application, a user equipment UE side reports multiple codewords and weight information of the multiple codewords. This can resolve a problem in the prior art that precision of downlink channel estimation performed by a BS side is relatively low because only a single codeword is reported, and can effectively enhance precision indicated by channel information, without increasing complexity of a codebook design and implementation.

Embodiment 2

Figure 5:
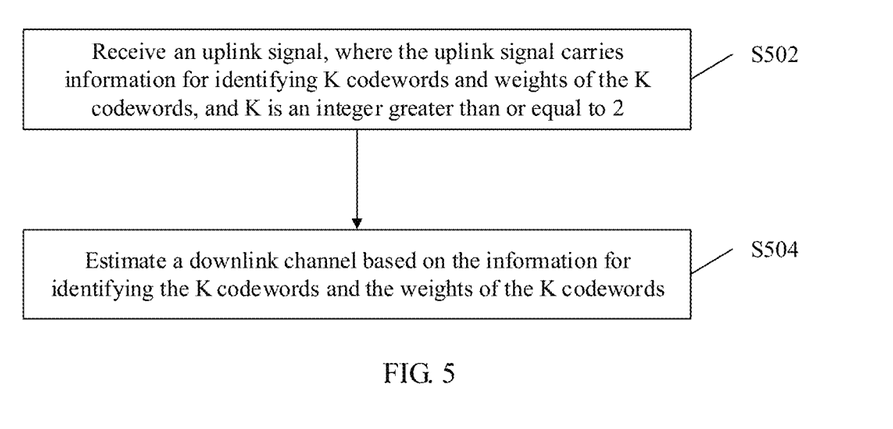
FIG. 5 is a schematic flowchart of a channel state obtaining method according to an embodiment of the present application.

Another embodiment of the present application provides a channel state information obtaining method 500, including the following steps.

Step 502: Receive an uplink signal, where the uplink signal carries information for indicating K codewords and weights of the K codewords, and K is an integer greater than or equal to 2.

Step 504: Estimate a downlink channel based on the information for indicating the multiple codewords and the weights of the multiple codewords.

Optionally, before step 502, the method 500 further includes:

Step 501: Transmit a downlink signal to UE, where the downlink signal carries a pilot.

It should be understood that, codebook information prestored by a BS is consistent with codebook information prestored by the UE.

It should be further understood that, after receiving the uplink signal, the BS demodulates and decodes the signal to obtain the information for indicating the multiple codewords and the information for indicating the weights of the multiple codewords.

The K codewords are obtained according to the prestored codebook information and the information for indicating the multiple codewords.

The weights of the multiple codewords are obtained according to the information for indicating the weights of the multiple codewords.

Optionally, when the UE side uses the first manner mentioned in Embodiment 1 to transmit the weight information of the K codewords, when the BS side receives information $[\beta_1 \beta_2 \ldots \beta_K]$ for identifying weights of $[\alpha_1 \alpha_2 \ldots \alpha_K]$, an element $\beta_k$ whose modulus value is the largest is selected from $[\beta_1 \beta_2 \ldots \beta_K]$, and a power scaling factor of the weight information is calculated according to received amplitude calibration information AMP that is quantized into B bits:

$$a = AMP/(|\beta_k| \times 2^B).$$

Finally, an actually transmitted weight is calculated according to the power scaling factor a and the received weight information $[\beta_1 \beta_2 \ldots \beta_K]$:

$$[\alpha_1 \alpha_2 \ldots \alpha_K] = a \times [\beta_1 \beta_2 \ldots \beta_K].$$

For example, if $|\alpha_k|=0.49$, $|\beta_k|=0.27$, B=10, $$AMP = floor(|\alpha_k| \times 2^B) = 501; \text{ and}$$

$$a = AMP/(|\beta_k| \times 2^B) = 1.8121.$$

Optionally, when the UE side uses the second manner mentioned in Embodiment 1 to transmit the identity information of the K codewords and the weight information of the K codewords, when the BS side receives a binary bitstream, the BS side can obtain the indication information of the K codewords and the weight information of the K codewords only by decoding the bitstream.

Optionally, when the UE side uses the third manner (that is, uses the new codebook CB) mentioned in Embodiment 1 to transmit the identity information of the K codewords and the weight information of the K codewords, when the BS side receives sequence numbers of the codewords, the BS side can obtain the K codewords and the weight information of the K codewords according to the sequence numbers of the codewords and the codebook CB.

It should be further understood that, the information for indicating the multiple codewords is a binary bitstream formed by the sequence numbers of the multiple codewords.

For the information for indicating the weights of the multiple codewords, refer to descriptions about the three different methods in Embodiment 1. Details are not further described herein.

Optionally, an algorithm for estimating the downlink channel may be:

$$\hat{h}_{DL} = \sum_k \alpha_k * c_k,$$

where $\hat{h}_{DL}$ indicates a downlink channel estimation matrix, $\Sigma_k \alpha_k * c_k$ indicates a sum of products of $\alpha_k$ and $c_k$, $\alpha_k$ indicates a weight of a $K^{th}$ codeword, and $c_k$ indicates the $K^{th}$ codeword.

It should be understood that, Embodiment 2 of the present application is a receive side relative to Embodiment 1. Related descriptions in Embodiment 1 are also applicable to Embodiment 2, and are not repeated herein.

In this embodiment of the present application, the downlink channel is estimated according to the multiple codewords and the weight information of the multiple codewords that are reported by the UE side. This can effectively enhance precision indicated by channel information, without increasing complexity of a codebook design and implementation.

Embodiment 3

Figure 6:
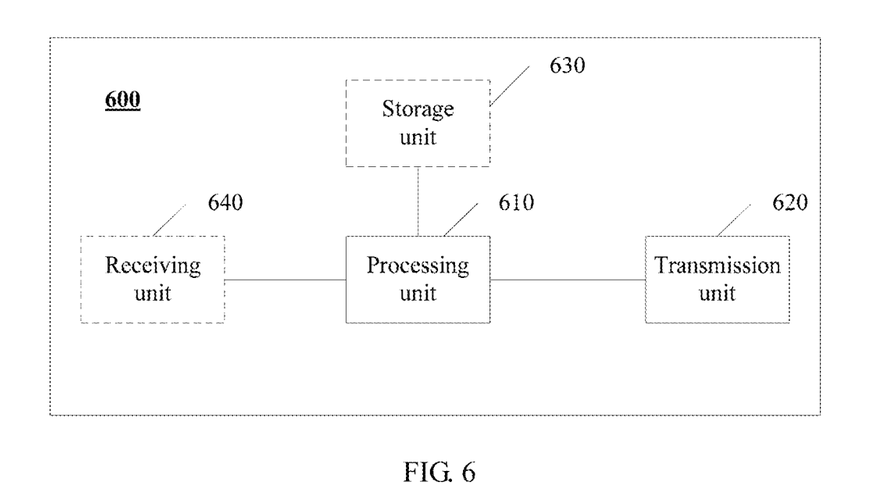
FIG. 6 is a schematic structural diagram of a channel state feedback apparatus according to an embodiment of the present application.

FIG. 6 is a simplified functional block diagram of a channel state feedback apparatus 600 according to another embodiment of the present application. The apparatus 600 includes a processing unit 610 and a transmission unit 620, where the processing unit 610 is configured to generate an uplink signal, where the uplink signal carries information for indicating K codewords and information for indicating weights of the K codewords, and K is an integer greater than or equal to 2; and the transmission unit 620 is configured to transmit the uplink signal to a base station, so that the base station estimates a downlink channel based on the K codewords and the weights of the K codewords.

Optionally, the apparatus 600 further includes a storage unit 630, configured to store a codebook, where the codebook includes multiple codewords.

Optionally, the apparatus 600 further includes a receiving unit 640, where the receiving unit 640 is configured to receive a downlink signal, where the downlink signal includes a pilot.

Optionally, the processing unit 610 is further configured to obtain a downlink channel matrix $h_{DL}$ according to the pilot.

Optionally, the processing unit 610 is further configured to obtain the weights of the K codewords.

Specifically, the processing unit 610 is configured to generate the weights of the K codewords based on the downlink channel estimation matrix and the prestored codebook.

Specifically, the processing unit 610 is further configured to multiply the prestored codebook that undergoes conjugate transpose processing, by the downlink channel estimation matrix, to generate the weights of the K codewords.

Optionally, the processing unit 610 is further configured to obtain the K codewords.

Specifically, the processing unit 610 is further configured to map the downlink channel matrix to each base of the prestored codebook, and select, based on sizes of components of the downlink channel matrix on each base, codewords corresponding to first K largest components.

Specifically, the processing unit 610 is further configured to perform the following steps:

A. mapping the downlink channel matrix to each base of the prestored codebook, and obtaining a codeword corresponding to a largest component, as one of the K codewords;

B. deleting, from the downlink channel matrix, a product of the codeword corresponding to the largest component and a weight of the codeword; and C. repeating the steps A and B until the K codewords are obtained.

Optionally, the storage unit 630 is further configured to store a second codebook CB. For a design of the second codebook CB, refer to descriptions in Embodiment 1. Details are not further described herein.

It should be understood that, this embodiment of the present application is an apparatus embodiment corresponding to Embodiment 1, and the descriptions in the method Embodiment 1 are also applicable to Embodiment 3. Details are not further described herein.

In this embodiment of the present application, a user equipment UE side reports multiple codewords and weight information of the multiple codewords. This can resolve a problem in the prior art that precision of downlink channel estimation performed by a BS side is relatively low because only a single codeword is reported, and can effectively enhance precision indicated by channel information, without increasing complexity of a codebook design and implementation.

Embodiment 4

Figure 7:
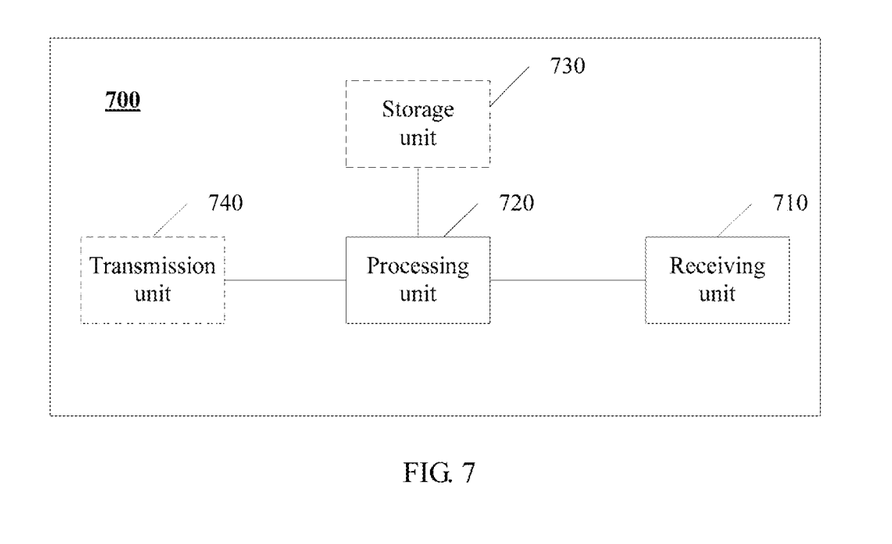
FIG. 7 is a schematic structural diagram of a channel state obtaining apparatus according to an embodiment of the present application.

FIG. 7 is a simplified functional block diagram of a channel state obtaining apparatus 700 according to another embodiment of the present application. The apparatus 700 includes a receiving unit 710 and a processing unit 720, where the receiving unit 710 is configured to receive an uplink signal, where the uplink signal carries information for identifying K codewords and weights of the K codewords, and K is an integer greater than or equal to 2; and the processing unit 720 is configured to estimate a downlink channel based on the information for identifying the K codewords and the weights of the K codewords.

Optionally, the apparatus 700 further includes a storage unit 730, configured to store a codebook, where the codebook includes multiple codewords.

Optionally, the apparatus 700 further includes a transmission unit 740, configured to transmit a downlink signal to UE, where the downlink signal includes a pilot, so that the UE obtains a downlink channel matrix according to the pilot.

Optionally, the processing unit 720 is further configured to demodulate and decode the uplink signal to obtain the information for identifying the K codewords and the information for identifying the weights of the K codewords.

Optionally, the processing unit 720 is further configured to obtain the K codewords according to the stored codebook and the information for identifying the K codewords.

Optionally, the processing unit 720 is further configured to obtain the weights of the K codewords according to the information for identifying the weights of the K codewords.

Optionally, the processing unit 720 obtains a downlink channel estimation matrix according to the following algorithm:

$$\hat{h}_{DL} = \sum_k \alpha_k * c_k,$$

where $\hat{h}_{DL}$ indicates the downlink channel estimation matrix, $\Sigma_k \alpha_k * c_k$ indicates a sum of products of $\alpha_k$ and $c_k$, $\{c_k\}$ indicates the weights of the K codewords, and $\{c_k\}$ indicates the K codewords.

Optionally, the uplink signal is an OFDM symbol.

It should be understood that, all introductions and descriptions in the method embodiment of the present application may be applicable to the apparatus embodiment. Specific examples are not further described herein. Refer to the descriptions in the method embodiment.

It should be further understood that, apparatuses in FIG. 6 and FIG. 7 are presented in forms of functional units. Without being limited, the term "unit" used in the specification may be an application-specific integrated circuit (ASIC) executing one or more software or firmware programs, an electronic circuit, a (shared or dedicated or group) processor and a memory, a combined logic circuit, and/or another appropriate component providing the function.

Embodiment 5

Figure 8:
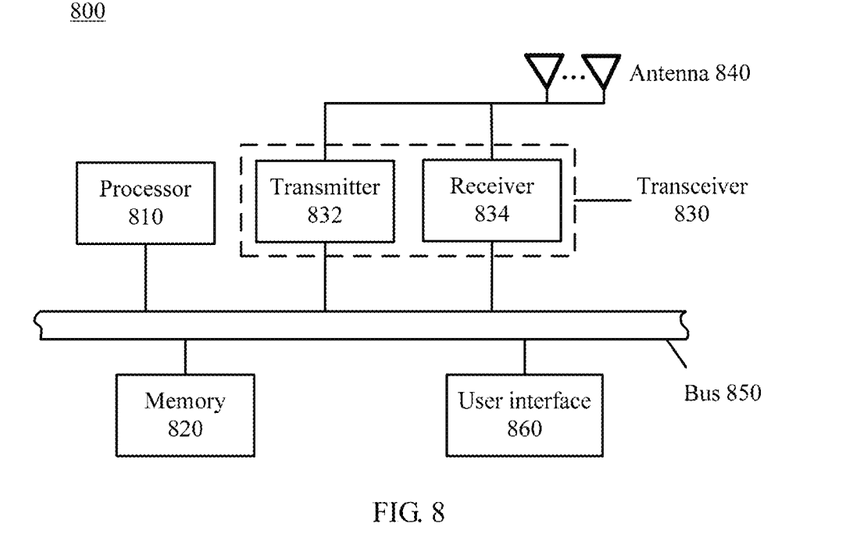
FIG. 8 is a schematic structural diagram of user equipment according to an embodiment of the present application.

FIG. 8 is a schematic block diagram of a network element according to another embodiment of the present application. The network element 800 includes a processor 810, a memory 820, a transceiver 830, an antenna 840, a bus 850, and a user interface 860.

Specifically, the processor 810 controls an operation of the network element 800. The processor may be a general purpose processor, a digital signal processor, an application-specific integrated circuit, a field programmable gate array, or another programmable logic device.

The transceiver 830 includes a transmitter 8302 and a receiver 8304, where the transmitter 8302 is configured to transmit a signal, and the receiver 8304 is configured to receive a signal. There may be one or more antennas 840. The network element 800 may further include the user interface 860, for example, a keyboard, a microphone, a speaker, and/or a touchscreen. The user interface 860 may transfer content and a control operation to the network element 800.

Components of the network element 800 are coupled together by the bus 850. The bus 850 further includes a power bus, a control bus, and a status signal bus, in addition to a data bus. However, for clear description, various buses in the figure are marked as the bus system 850. It should be noted that, the descriptions about the structure of the network element may be applied to this embodiment of the present application.

The memory 820 may include a read only memory (ROM) and a random access memory (RAM), or other types of dynamic storage devices capable of storing information and instructions, or may be a magnetic disk storage. The memory 820 may be configured to store an instruction for implementing a related method provided by an embodiment of the present application. It may be understood that, an executable instruction is programmed or loaded to at least one of a cache and a long-term storage for the processor 810 of the network element 800. In a specific embodiment, the memory is configured to store computer-executable program code. When the program code includes an instruction, when the processor executes the instruction, the instruction enables the network element to perform the following operations:

generating an uplink signal, where the uplink signal carries information for identifying K codewords and information for identifying weights of the K codewords, and K is an integer greater than or equal to 2; and transmitting the uplink signal to a base station, so that the base station estimates a downlink channel.

For a specific implementation of operations performed by the processor included in the network element used as user equipment UE, refer to corresponding steps in Embodiment 1. Details are not further described in this embodiment of the present application.

Embodiment 6

Figure 9:
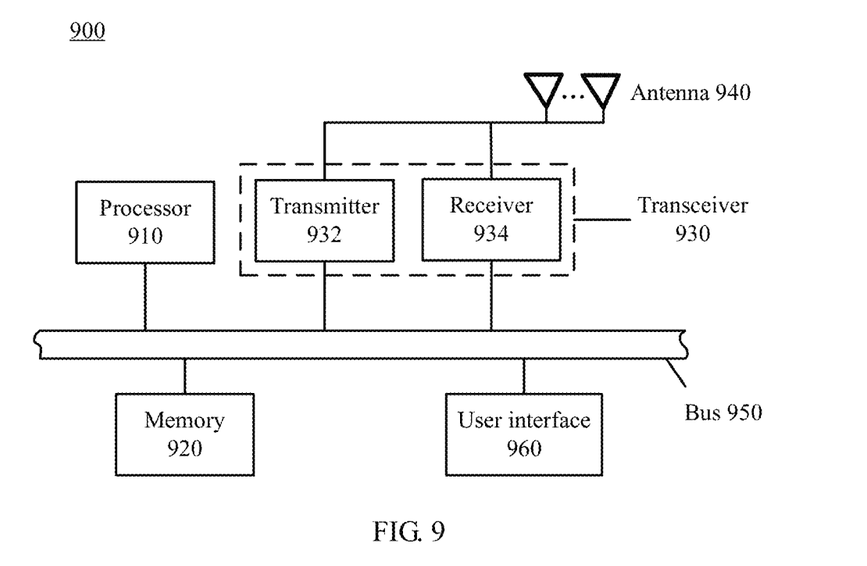
FIG. 9 is a schematic structural diagram of a base station according to an embodiment of the present application.

FIG. 9 is a schematic block diagram of a network element according to another embodiment of the present application. The network element 900 includes a processor 910, a memory 920, a transceiver 930, an antenna 940, a bus 950, and a user interface 960.

Specifically, the processor 910 controls an operation of the network element 900. The processor may be a general purpose processor, a digital signal processor, an application-specific integrated circuit, a field programmable gate array, or another programmable logic device.

The transceiver 930 includes a transmitter 9302 and a receiver 9304, where the transmitter 932 is configured to transmit a signal, and the receiver 934 is configured to receive a signal. There may be one or more antennas 940. The network element 900 may further include the user interface 960, for example, a keyboard, a microphone, a speaker, and/or a touchscreen. The user interface 960 may transfer content and a control operation to the network element 900.

Components of the network element 900 are coupled together by the bus 950. The bus system 950 further includes a power bus, a control bus, and a status signal bus, in addition to a data bus. However, for clear description, various buses in the figure are marked as the bus system 950. It should be noted that, the descriptions about the structure of the network element may be applied to this embodiment of the present application.

The memory 920 may include a read only memory (ROM) and a random access memory (RAM), or other types of dynamic storage devices capable of storing information and instructions, or may be a magnetic disk storage. The memory 920 may be configured to store an instruction for implementing a related method provided by an embodiment of the present application. It may be understood that, an executable instruction is programmed or loaded to at least one of a cache and a long-term storage for the processor 910 of the network element 900. In a specific embodiment, the memory is configured to store computer-executable program code. When the program code includes an instruction, when the processor executes the instruction, the instruction enables the network element to perform the following operations:

receiving an uplink signal, where the uplink signal carries information for identifying K codewords and weights of the K codewords, and K is an integer greater than or equal to 2; and estimating a downlink channel based on the information for identifying the K codewords and the weights of the K codewords.

For a specific implementation of operations performed by the processor included in the network element used as a base station, refer to corresponding steps in Embodiment 2. Details are not further described in this embodiment of the present application.

An embodiment of the present application further provides a computer storage medium, configured to store computer software instructions used by the user equipment. The computer storage medium contains a program designed for executing the foregoing aspects.

An embodiment of the present application further provides a computer storage medium, configured to store computer software instructions used by the base station. The computer storage medium contains a program designed for executing the foregoing aspects.

An embodiment of the present application further provides a communications network system, including user equipment and a base station. The base station is connected to the multiple UEs by using a wireless network. The multiple UEs are configured to: generate an uplink signal, where the uplink signal carries information for identifying K codewords and information for identifying weights of the K codewords, and K is an integer greater than or equal to 2; and transmit the uplink signal to the base station, so that the base station estimates a downlink channel.

The base station is configured to receive the uplink signal, and estimate the downlink channel based on the information for identifying the K codewords and the weights of the K codewords.

For interaction between the UE and the base station, refer to other embodiments. Details are not further described herein.

In the embodiments of the present application, a UE side reports multiple codewords and weight information of the multiple codewords. This can resolve a problem in the prior art that precision of downlink channel estimation performed by a BS side is relatively low because only a single codeword is reported, and can effectively enhance precision indicated by channel information, without increasing complexity of a codebook design and implementation.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present application, but are not intended to limit the present application. Any modification, equivalent replacement, and improvement made without departing from the spirit and principle of the present application shall fall within the protection scope of the present application.

What is claimed is:

1. A channel state feedback method, comprising:
obtaining K codewords, wherein K is an integer greater than or equal to 2;
generating an uplink signal carrying information for identifying the K codewords and information for identifying weights of the K codewords; and transmitting the uplink signal to a base station to enable the base station to estimate a downlink channel, wherein obtaining the K codewords comprises one of:
mapping a downlink channel matrix to each base of a prestored codebook and selecting, based on sizes of components of the downlink channel matrix on each base, codewords corresponding to first K largest components; or (a) mapping a downlink channel matrix to each base of a prestored codebook and obtaining a codeword corresponding to a largest component, as one of the K codewords;

(b) deleting, from the downlink channel matrix, a product of the codeword corresponding to the largest component and a weight of the codeword; and (c) repeating (a) and (b) until the K codewords are obtained.

2. The channel state feedback method of claim 1, wherein before generating the uplink signal, the method further comprises:
receiving a downlink signal comprising a pilot; and
obtaining the downlink channel matrix according to the pilot.

3. The channel state feedback method of claim 1, further comprising obtaining the weights of the K codewords.

4. The channel state feedback method of claim 3, wherein obtaining the weights of the K codewords comprises generating the weights of the K codewords based on the downlink channel matrix and the prestored codebook.

5. The channel state feedback method of claim 4, wherein the prestored codebook undergoes conjugate transpose processing, and wherein the weights of the K codewords are obtained by multiplying the prestored codebook by the downlink channel matrix.

6. The channel state feedback method of claim 1, wherein obtaining the K codewords further comprises forming the prestored codebook by prestoring a correspondence between each codeword in a codebook and one of K ($\alpha_k$, $c_k$) combinations, wherein $\alpha_k$ indicates a weight of a $K^{th}$ codeword, and wherein $c_k$ indicates the $K^{th}$ codeword.

7. A channel state obtaining method, comprising:
receiving an uplink signal carrying information for identifying K codewords and information for identifying weights of the K codewords, wherein K is an integer greater than or equal to 2; and
estimating a downlink channel based on the information for identifying the K codewords and the information for identifying the weights of the K codewords, wherein the downlink channel is estimated using the following algorithm:

$$\hat{h}_{DL} = \sum_k \alpha_k * c_k,$$

wherein $\hat{h}_{DL}$ indicates a downlink channel estimation matrix, wherein $\Sigma_k \alpha_k * c_k$ indicates a sum of products of $\alpha_k$ and $c_k$, wherein $\alpha_k$ indicates a weight of a $K^{th}$ codeword, and wherein $c_k$ indicates the $K^{th}$ codeword.

8. The channel state obtaining method of claim 7, further comprising obtaining the K codewords based on prestored codebook information.

9. A channel state feedback apparatus, comprising:
a processor configured to:
map a downlink channel matrix to each base of a prestored codebook;
select, based on sizes of components of the downlink channel matrix on each base, codewords corresponding to first K largest components; and
generate an uplink signal carrying information for identifying K codewords and information for identifying weights of the K codewords, wherein K is an integer greater than or equal to 2; and
a transmitter configured to transmit the uplink signal to a base station to enable the base station to estimate a downlink channel.

10. The channel state feedback apparatus of claim 9, further comprising a storage unit configured to store a codebook comprising multiple codewords.

11. The channel state feedback apparatus of claim 9, wherein the processor is configured to obtain the weights of the K codewords.

12. The channel state feedback apparatus of claim 9, wherein the processor is configured to obtain the K codewords.

13. The channel state feedback apparatus of claim 9, further comprising a receiver configured to receive a downlink signal comprising a pilot, wherein the processor is further configured to obtain the downlink channel matrix according to the pilot.

14. The channel state feedback apparatus of claim 9, wherein the processor is further configured to generate the weights of the K codewords based on the downlink channel matrix and a codebook.

15. The channel state feedback apparatus of claim 12, wherein the prestored codebook undergoes conjugate transpose processing, and wherein the processor is further configured to multiply the prestored codebook by the downlink channel matrix, to generate the weights of the K codewords.

16. The channel state feedback apparatus of claim 12, wherein the processor is further configured to obtain the K codewords by:

(a) mapping the downlink channel matrix to each base of the prestored codebook and obtaining a codeword corresponding to a largest component, as one of the K codewords;

(b) deleting, from the downlink channel matrix, a product of the codeword corresponding to the largest component and a weight of the codeword; and (c) repeating (a) and (b) until the K codewords are obtained.

* * * * *

UNITED STATES PATENT AND TRADEMARK OFFICE
CERTIFICATE OF CORRECTION

PATENT NO. : 10,750,508 B2
APPLICATION NO. : 16/186282
DATED : August 18, 2020
INVENTOR(S) : Wei Han, Xiaoyan Bi and Dageng Chen Page 1 of 1

It is certified that error appears in the above-identified patent and that said Letters Patent is hereby corrected as shown below:

In the Claims

Claim 7, Column 21, Line 54: "$\sum_{k} a_k * c_k$" should read "$\sum_{k} \alpha_k * c_k$"

Signed and Sealed this
Twentieth Day of October, 2020

Andrei Iancu
*Director of the United States Patent and Trademark Office*